April 23, 1940.    J. HELD    2,198,559
MECHANISM FOR FASHIONING KNITTED FABRICS
Filed Feb. 29, 1936    10 Sheets-Sheet 1
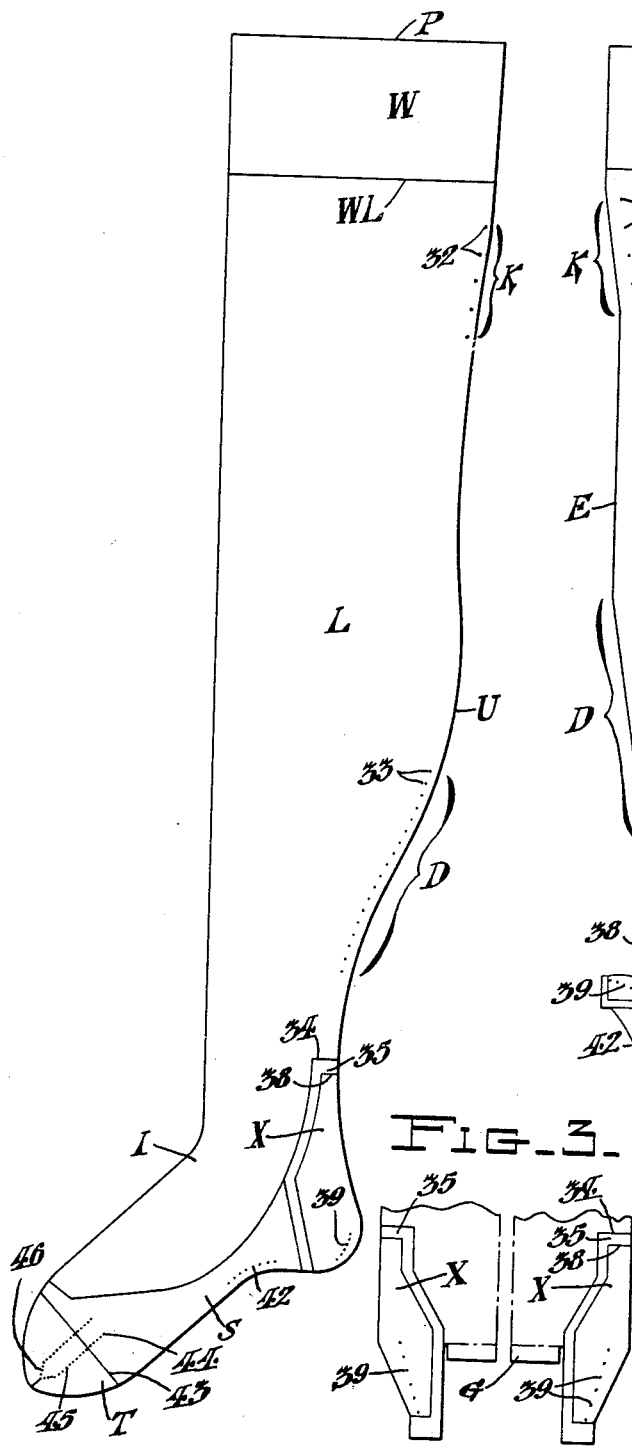
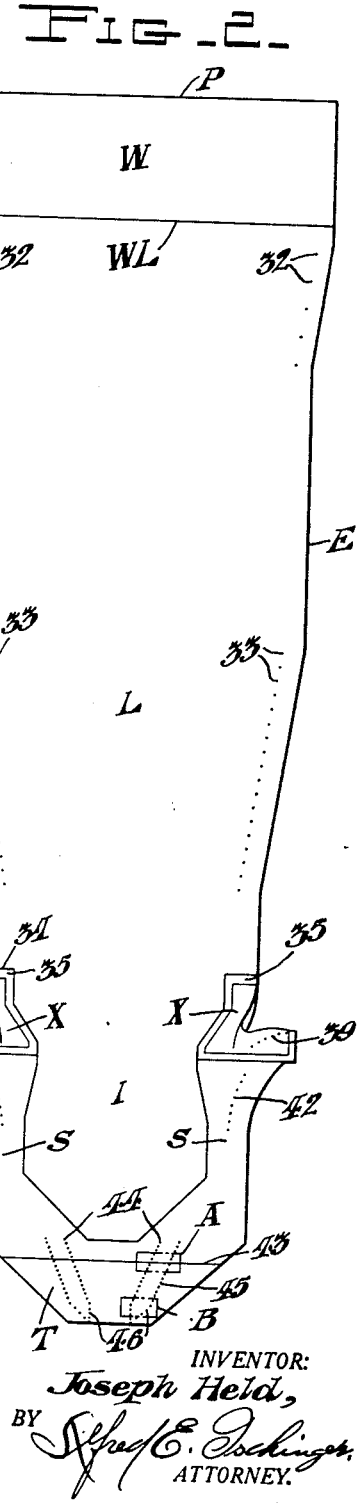
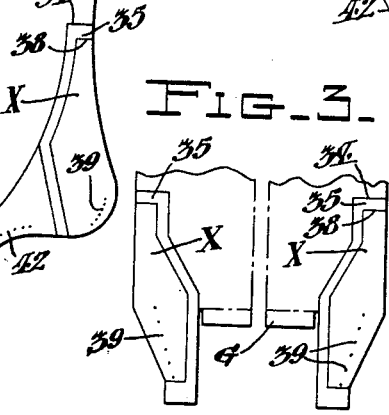
INVENTOR:
Joseph Held,
BY Alfred E. Ischinger,
ATTORNEY.

April 23, 1940. J. HELD 2,198,559
MECHANISM FOR FASHIONING KNITTED FABRICS
Filed Feb. 29, 1936 10 Sheets-Sheet 2
FIG_4_
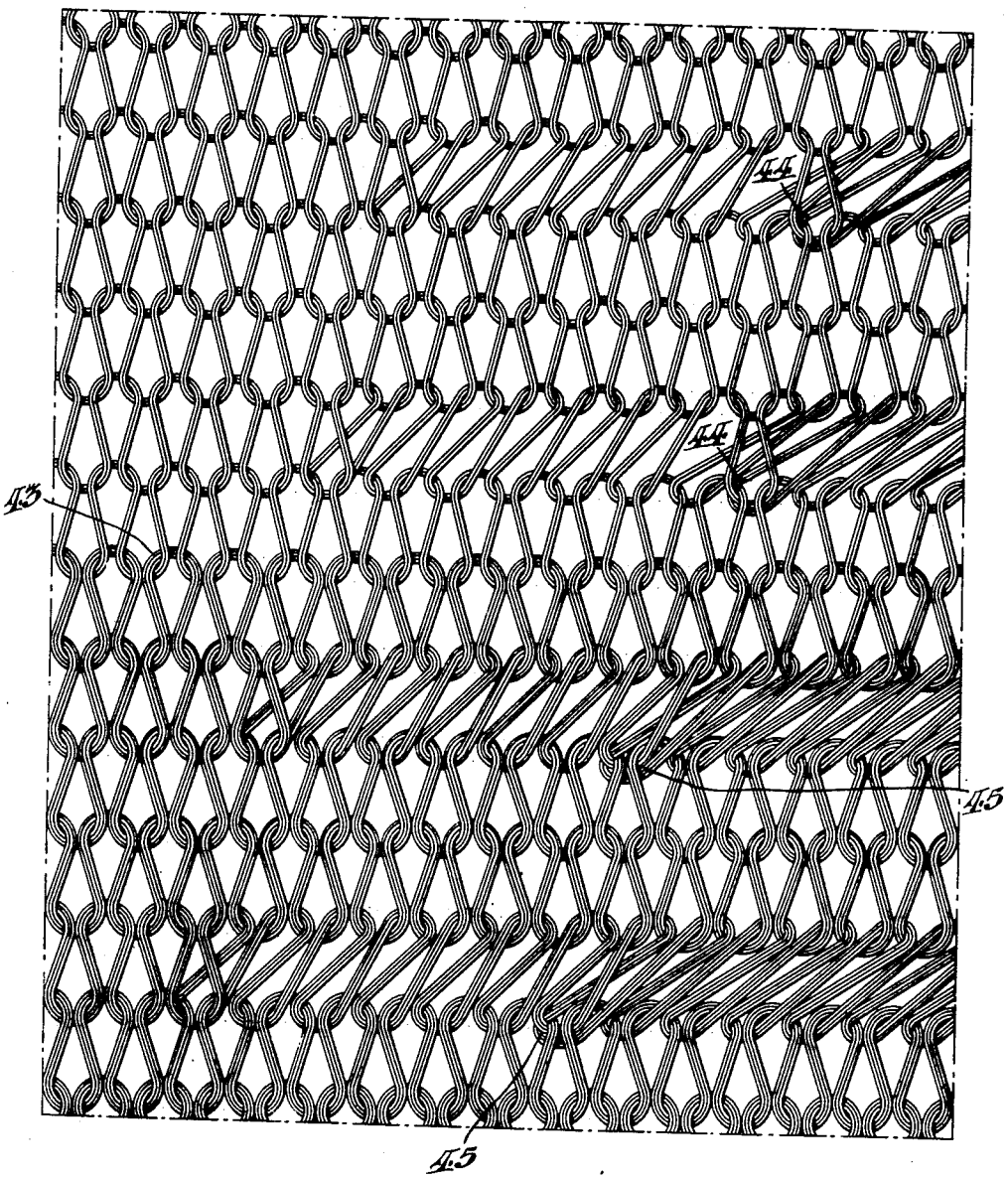
INVENTOR:
Joseph Held,
BY
ATTORNEY.

April 23, 1940.                    J. HELD                    2,198,559
MECHANISM FOR FASHIONING KNITTED FABRICS
Filed Feb. 29, 1936          10 Sheets-Sheet 3

INVENTOR:
Joseph Held,
BY
ATTORNEY.

April 23, 1940.  J. HELD  2,198,559
MECHANISM FOR FASHIONING KNITTED FABRICS
Filed Feb. 29, 1936  10 Sheets-Sheet 4

INVENTOR:
Joseph Held,
BY
Alfred E. Dieckinger
ATTORNEY.

April 23, 1940. J. HELD 2,198,559
MECHANISM FOR FASHIONING KNITTED FABRICS
Filed Feb. 29, 1936 10 Sheets-Sheet 6
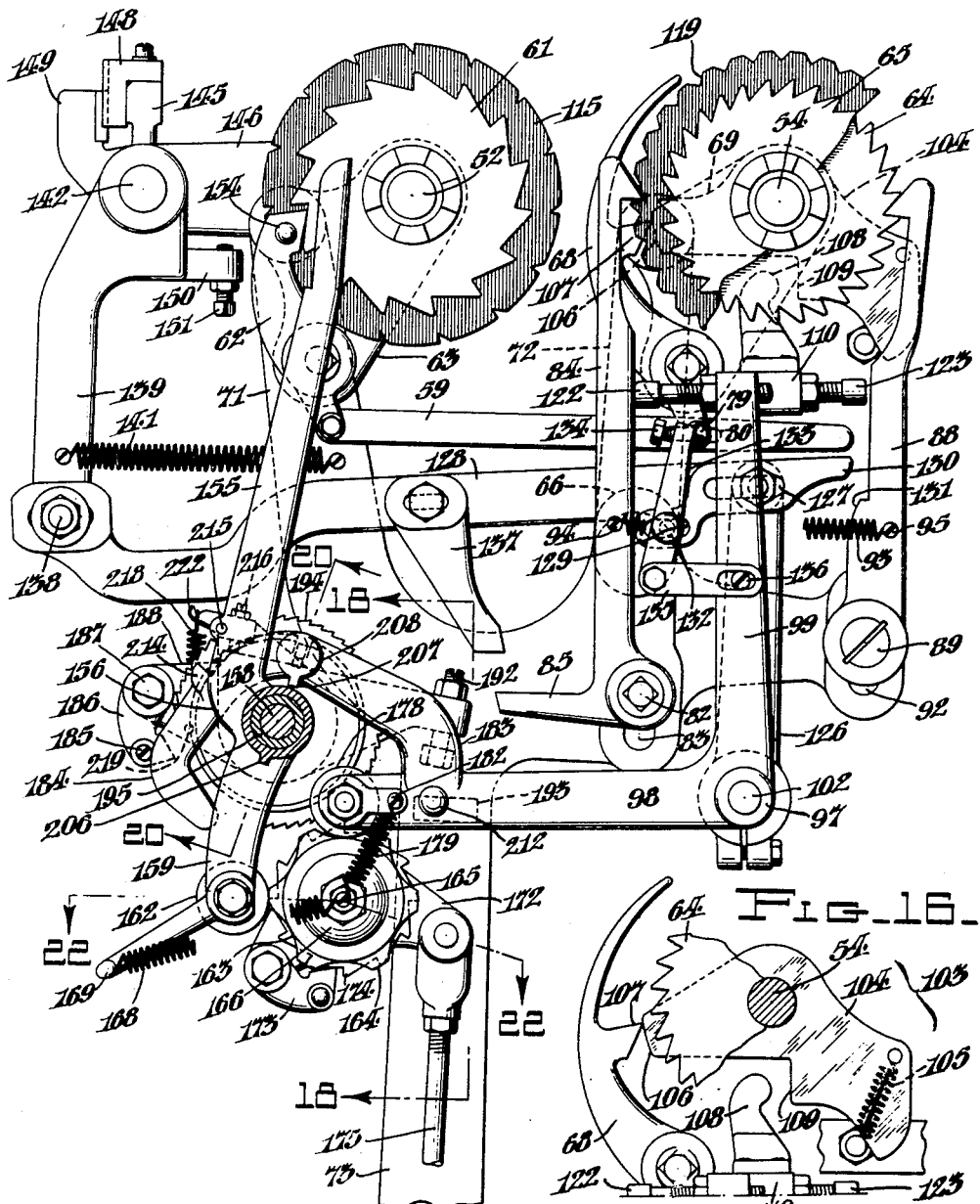
INVENTOR:
Joseph Held,
BY
ATTORNEY.

April 23, 1940.  J. HELD  2,198,559
MECHANISM FOR FASHIONING KNITTED FABRICS
Filed Feb. 29, 1936   10 Sheets-Sheet 7
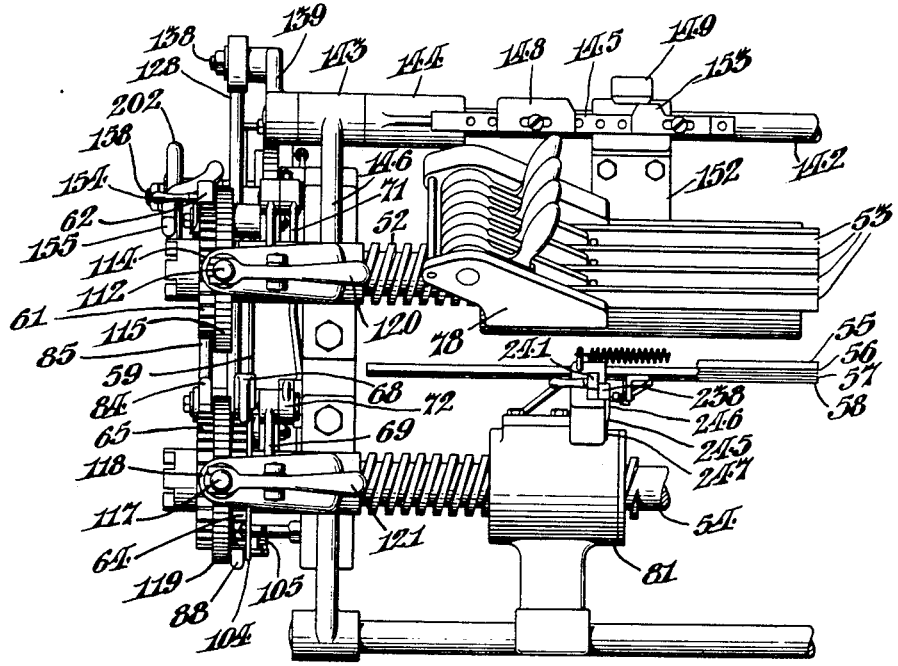
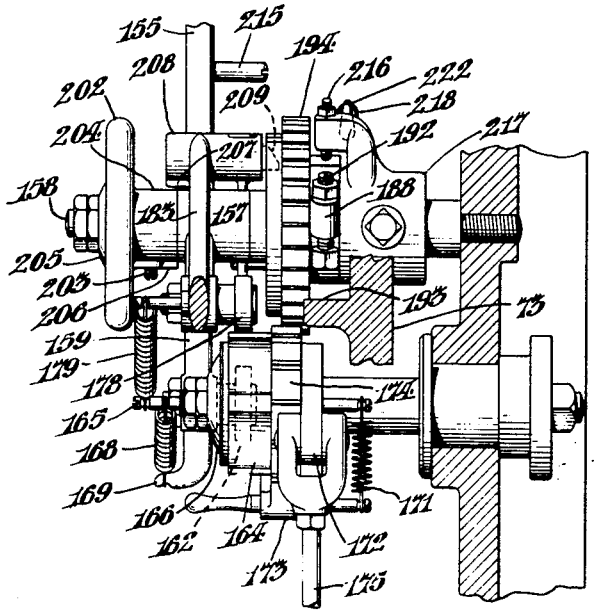
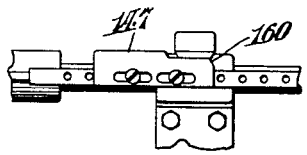
INVENTOR:
Joseph Held,
BY
ATTORNEY.

April 23, 1940.  J. HELD  2,198,559
MECHANISM FOR FASHIONING KNITTED FABRICS
Filed Feb. 29, 1936    10 Sheets-Sheet 8
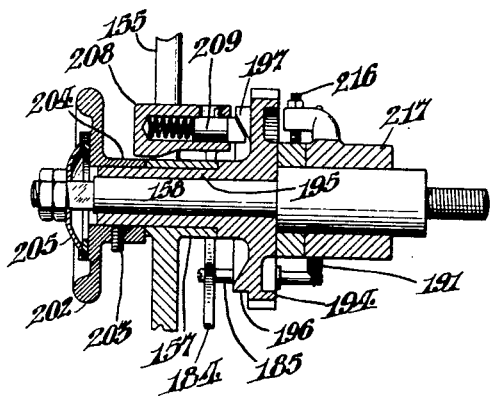
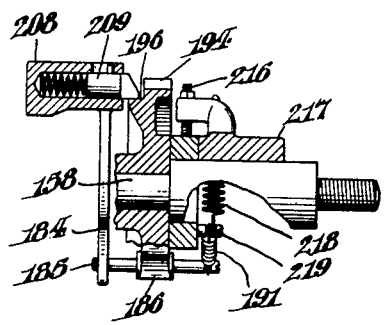
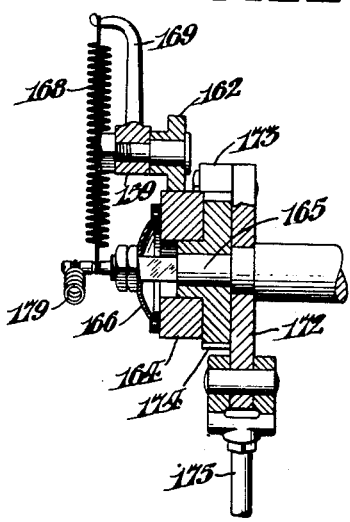
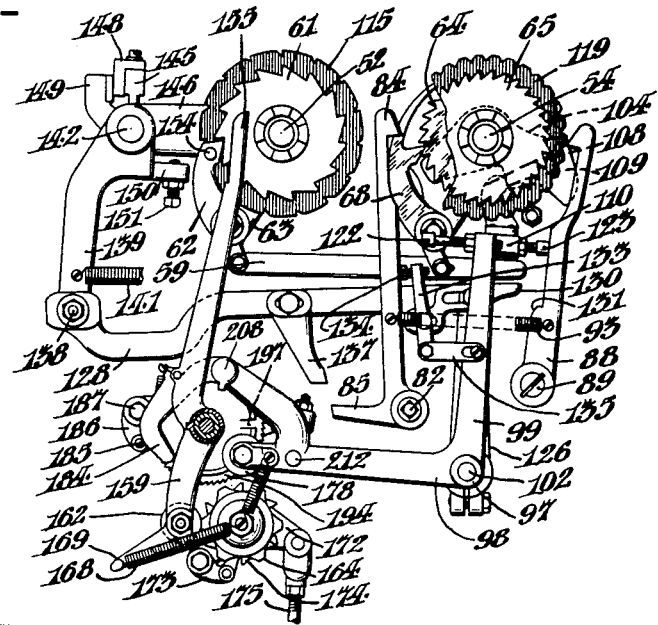
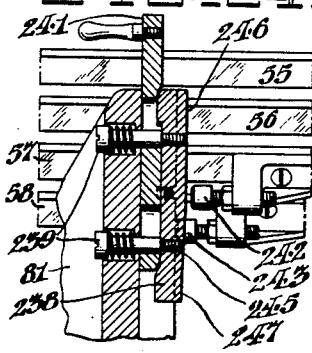
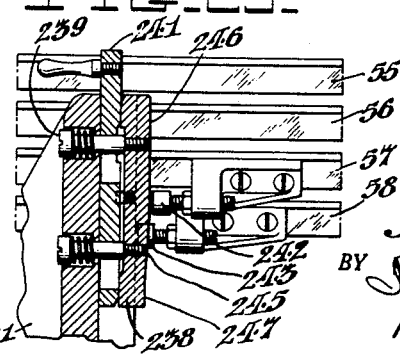
INVENTOR:
Joseph Held,
BY
ATTORNEY.

April 23, 1940.  J. HELD  2,198,559
MECHANISM FOR FASHIONING KNITTED FABRICS
Filed Feb. 29, 1936  10 Sheets-Sheet 9
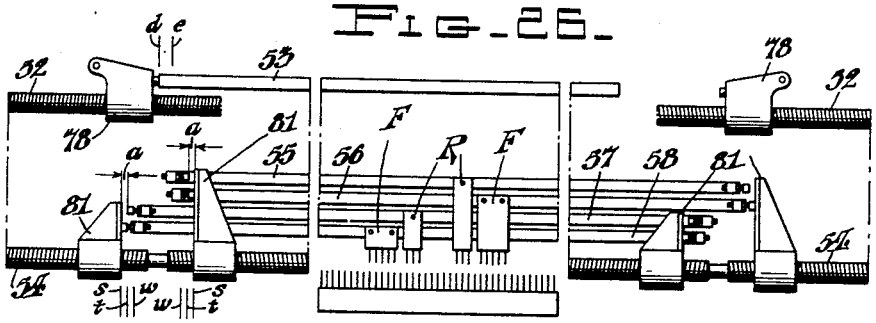
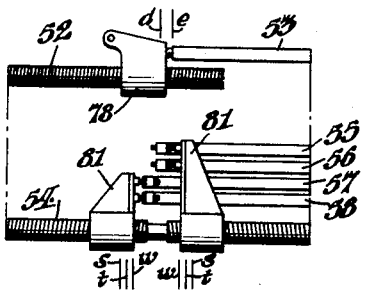
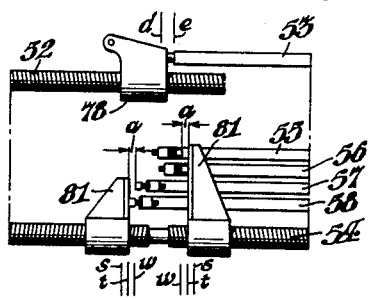
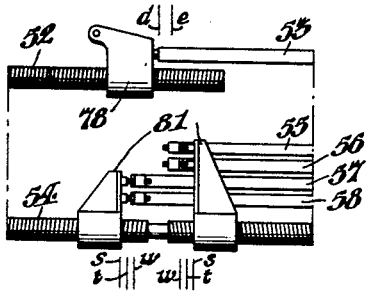
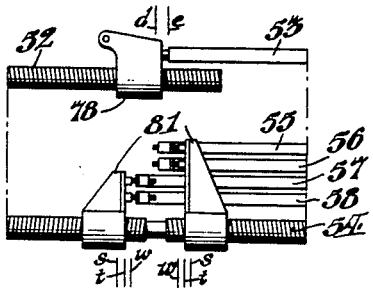
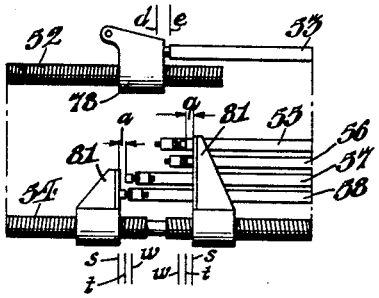
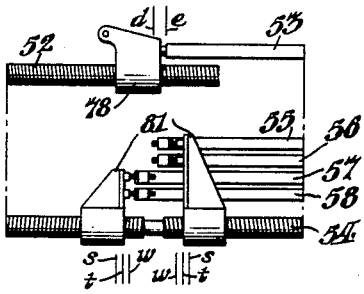
INVENTOR:
Joseph Held,
BY
ATTORNEY.

April 23, 1940.    J. HELD    2,198,559
MECHANISM FOR FASHIONING KNITTED FABRICS
Filed Feb. 29, 1936    10 Sheets-Sheet 10
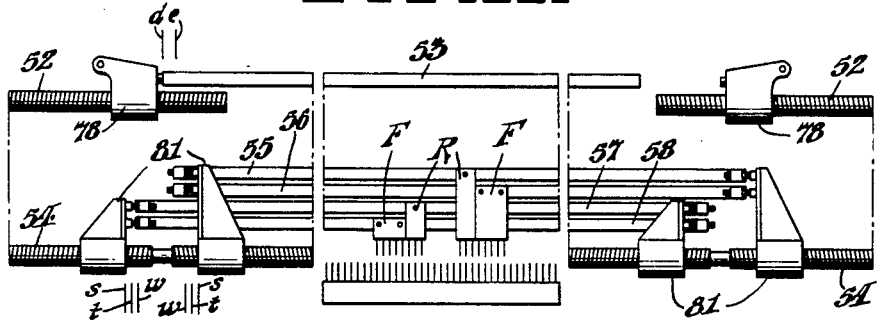
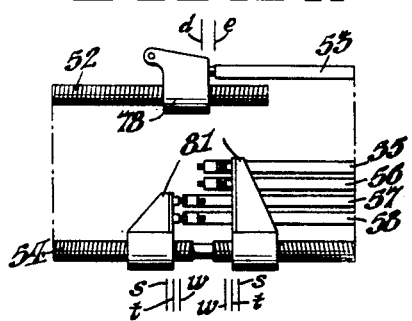 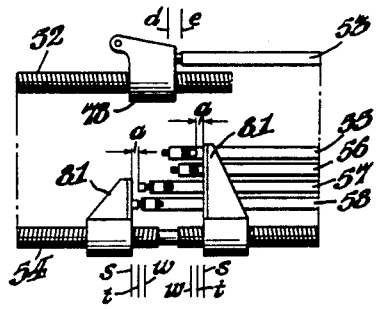
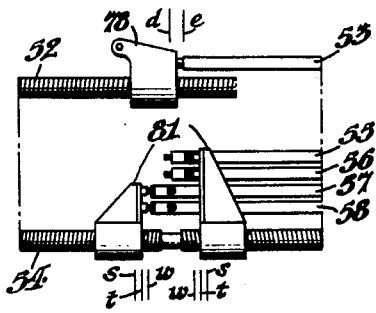 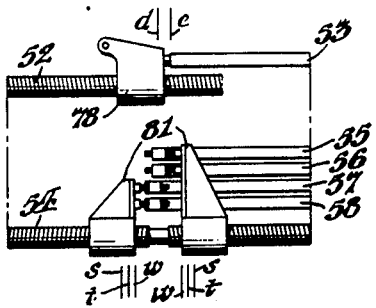
INVENTOR:
Joseph Held,
BY Alfred E. Ischinger,
ATTORNEY.

UNITED STATES PATENT OFFICE 2,198,559

MECHANISM FOR FASHIONING KNITTED FABRICS

Joseph Held, West Reading, Pa., assignor to Textile Machine Works, Wyomissing, Pa., a corporation of Pennsylvania Application February 29, 1936, Serial No. 66,328

25 Claims. (Cl. 66—89)

My invention relates to methods of, and mechanisms for, fashioning knitted fabrics, and particularly to narrowing full-fashioned stockings in heavily reinforced areas, as in the diamond-point toe portions.

In narrowing full-fashioned stocking blanks, it has been suggested to transfer loops for distances of one and two needles, and to effect one and two-needle transfers in the same courses, as in the diamond-point toe areas, where a two-needle transfer has been made in two one-needle steps by first picking up one multi-thread loop and depositing it on the next needle and then picking up the two multi-thread loops on this needle and transferring them to a third needle. This transfer, although not objectionable in areas of two-thread thickness, when it is applied in a three-thread area, such as the diamond-point toe area of a full-fashioned stocking blank or the like, it is rendered difficult and frequently ineffective, to the resultant damage to both the fabric and the machine, by reason of the great bulk of yarn.

One effect of picking up two loops on one point in such areas is the bending of the points to sometimes prevent them from properly registering with the needles, whereby loops are dropped and a defective fabric is produced, with the consequent loss of time and material.

Another result sometimes occurring is the breaking of the needle beards, which is equally damaging so far as loss of time and material are concerned.

A further result is the splitting of the loops caused by the great bunching of the threads, and, even though the loops be not dropped, or the needle beards be not broken, the loss of time and material cannot be avoided.

Thus, with so many different likely adverse effects in the transfer of the loops, and the possibility of more than one of them occurring at one time, the operation is extremely undesirable.

It has also been suggested to effect double needle narrowings by operating single point combs in single needle forward and double-needle backward steps, as in the heel tabs of a full-fashioned stocking leg blank, but this structure and this sequence of steps are not effective to produce a diamond-point toe area as by the invention.

An object of the invention is to provide a method of effecting two successive single needle loop transfers at each selvage in the same course to effect narrowing which, although desirable in narrowing with yarns of any number of threads, is especially effective in narrowing heavy fabrics, as in three-thread diamond-point toe areas, to avoid bending the points, dropping the loops, breaking the needle beards, splitting the loops, losing time, and producing a defective fabric, and to improve the operation of narrowing a full-fashioned stocking.

Another object is to provide means whereby the steps of the method may be practiced in effective practical manner, and the results obtained, to substantially maximum advantage.

Another object is to provide a narrowing counter having one or more of the features whereby it may be readily adapted to operate a knitting machine through any selected number of courses of narrowings of one kind, and upon completion of the selected number, to operate the machine through narrowings of another kind in one or more courses; to operate independently of the carrier nuts; to include a ratchet or indexing device for determining the narrowing courses step-by-step; to embody a rotating counting member; to occupy a fixed location, to be substantially coextensive longitudinally of the narrowing and carrier nut spindles with actuating means for the spindles; and to have other construction, character, operation and advantages severally and in combination with each other, and with other elements, as will appear.

Another object is to provide mechanism including a narrowing counter in novel combination with other elements of the mechanism whereby a machine may be governed not only to automatically institute certain steps of the novel method, but to control the operation of a machine in accordance with other methods.

Another object of the invention is to practice the method by an attachment which may be applied to a standard full-fashioned knitting machine, with substantially minimum alteration in the machine, whereby point combs adjacent to the opposite selvage edges of a blank may effectively be operated reversely in successive steps of the method.

Another object is to provide a device of the above-indicated character of simple and durable construction, economical manufacture, and effective operation.

With these and other objects in view, which will become apparent from the following description of the exemplary embodiments of the invention illustrated in the accompanying drawings, the invention resides in the novel elements, steps, mechanisms, and combinations thereof, in cooperative relation, as hereinafter more particularly pointed out in the claims.

In the drawings:

Figure 1 is an outline view, in side elevation, of a full-fashioned stocking, in flat folded form, constructed in accordance with the steps and mechanisms, and constituting part, of the invention;

Fig. 2 is a view, indicating the blank from which the stocking of Fig. 1 is formed;

Fig. 3 illustrates a lower portion of the blank of Fig. 2, with the foot removed, and showing the lower portions of the leg, including the heel tabs, in flat form, as they appear on the legger machine before being topped onto the footer for receiving the foot;

Fig. 4 is a magnified stitch diagram of an area A of Fig. 2;

Fig. 15 is an enlarged view of the mechanism indicated at the upper portion of Fig. 14, parts being broken away;

Fig. 16 is a detail view of portions shown at the upper right of Fig. 15;

Fig. 17 is a top plan view of portions of the left-hand end of the machine;

Fig. 18 is a cross sectional view taken substantially along the line 18—18 of Fig. 15;

Fig. 19 is a detail view of a cam device operated by a carrier-rod nut of a legger machine, as distinguished from a corresponding device of a footer machine, as will appear;

Fig. 20 is a view taken substantially along the line 20—20 of Fig. 15;

Fig. 21 is a view similar to Fig. 20, parts being omitted and other parts being in positions different from those of Fig. 20;

Fig. 22 is a view taken substantially along the line 22—22 of Fig. 15;

Fig. 23 is a view similar to Fig. 15, showing the parts in different position from the position thereof in Fig. 15;

Fig. 24 is a view taken along the line 24—24 of Fig. 14 of a mechanism for adapting the machine to operate in accordance with the invention, or as an ordinary machine;

Fig. 25 is similar to Fig. 24 showing the parts in different position; and

Figs. 26 to 37, inclusive, are sequence diagrams, showing certain parts in various positions assumed at different points during the cycle of knitting the foot.

The drawings illustrate the parts of a "Reading" full-fashioned knitting machine necessary for an understanding of the invention; other parts, and the construction and operation thereof, being well known in the art, as set forth in the "Reading" Full Fashioned Knitting Machine Catalogue, copyright 1935, and published by the Textile Machine Works, Reading, Pennsylvania.

Referring to Figs. 1 to 5, inclusive, Fig. 1 indicates a full-fashioned stocking including a top edge P, a welt W, a welt line WL, a leg L, an instep I, a sole S, a toe T, and a back seam U, effected by joining selvage edges E.

Fig. 2 illustrates the stocking in Fig. 1 in flat blank form, as it comes off a footer machine, after having been transferred from a legger, and before the selvage edges E are joined to form the back seam U; the welt W being of double thickness between the top edge P and the welt line, as in usual practice.

In forming the blank, it is knitted of full width courses on the legger over an area twice the walewise length of the welt W, and folded as indicated in Fig. 2, to form the top edge P, and to top the first course onto the needles of the welt line course, whereupon, the full-width courses are resumed to the first narrowing course in the upper leg or knee area K. At intervals, throughout the length of the area K, narrowings, indicated by fashion marks 32, are inserted, in this instance the marks 32 preferably representing ordinary double-needle narrowing. In producing these narrowings, point combs C, one of which is indicated in each of Figs. 6 to 9, inclusive, are provided one at each side of the center wale of the blank. Each comb C picks up, with each of its points, a loop and transfers it away from the selvage edge E of the blank for a distance of two needles to the needles receiving the transferred loops, which receiving needles are in wales representing the coursewise starting positions of the next subsequent two-needle narrowing, and so on through the series of narrowings whereby the fashion marks are parallel to the selvage edges.

Figure 7:
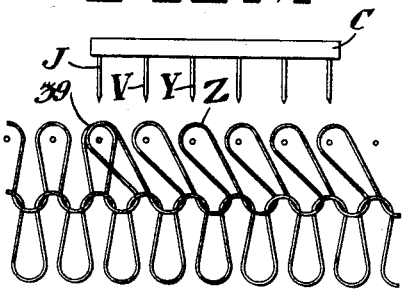

From the area K, courses having lengths equal to the length of the course of the lowermost marks 32 of the knee area K are knitted to the first of courses having narrowings represented by fashion marks 33, which are also preferably made by ordinary two-needle narrowings by the above-mentioned combs in a lower leg area D and effected in steps maintaining them parallel to the selvage edges E, as above set forth. From the lowermost mark 33 of the leg area D, courses having lengths equal to the last narrowing course in the area D are knitted to top courses 34 of heel areas 35, where a single reinforcing yarn is introduced. From the first reinforced course, body courses having lengths equal to the last narrowing course in the area D, and partial courses of the single plating yarns are laid to the first course 38 in an extra reinforced area X; the body yarn and the two reinforcing yarns being laid and knitted to the first narrowing course, represented by fashion marks 39 in the three-thread area, as better seen in Fig. 3. Referring to Figs. 6 to 9, by considering a point J on the comb C as the first or leading point of a series of three points, in which points V and Y are the second and third points of the series, in the direction of loop transfer, will be seen the operation of the legger machine, whereby two-needle transfer of a loop Z in this extra yarn area is effected in one-needle steps. In producing these narrowings, the point comb C is first positioned, as in Fig. 6, to pick up loops, and then moved forward one needle, as indicated in Fig. 7, to advance the transfer loops each one needle. The combs are next retracted two needles, as indicated in Fig. 8, to again pick up loops, and moved forward one needle, to position, as indicated in Fig. 9, to complete a two needle transfer of certain transfer loops in two single needle steps. The combs are then given a one needle idle retractive movement to position them for the start of the next subsequent narrowing, so that the fashion marks 39 extend along lines sloping relative to the selvage edges, as shown. These operations in the reinforced heel-tab area X, although of previous suggestion, have not been instituted or controlled by the narrowing counter of the invention, as will appear. During the latter courses of the above-described operations, ravel courses G are formed between the heel tabs. The full width body courses are discontinued at the start of the ravel courses G between the heel tabs, and the body thread carrier, which had been laying these courses is adjusted to lay the body yarn in one of the heel tabs, while another carrier is introduced into operation to lay a yarn corresponding to the body yarn in the other heel tab. This represents the end of the blank as knitted on the legger.

After being topped onto the footer, and completed, the blank appears as in Fig. 2.

Figure 5:
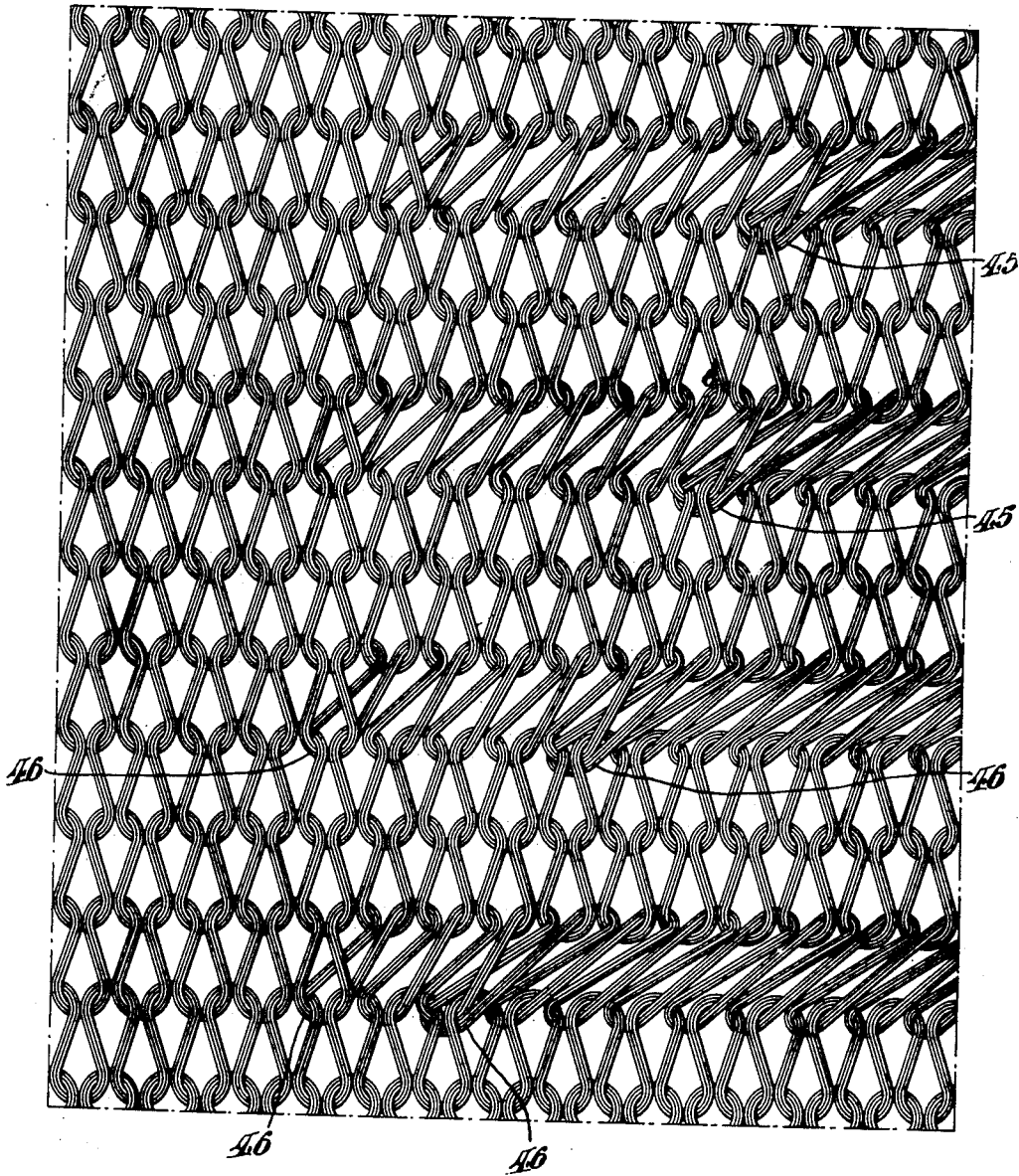
Fig. 5 is a magnified stitch diagram of an area B of Fig. 2.
Figure 6:
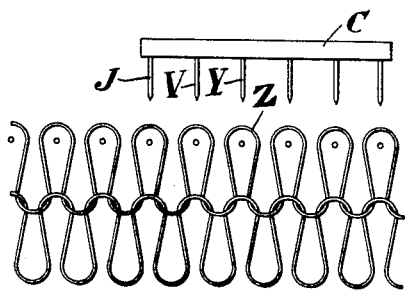
Figs. 6, 7, 8 and 9 are diagrams of points and needles of a legger machine, illustrating the sequence of operation of the points to effect two-needle fashioning of loops in one-needle steps as controlled by the narrowing counter of the invention.
Figure 10:
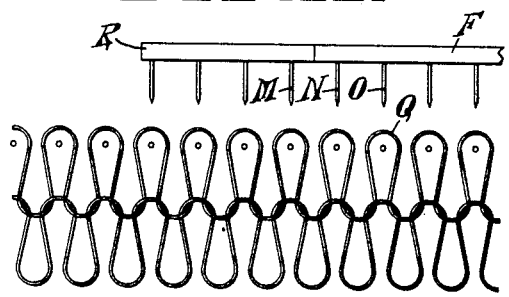
Figs. 10, 11, 12 and 13 are diagrams of point combs and needles of a footer machine, illustrating the sequence of operation of the points to effect two-needle narrowing of loops in one-needle steps according to, and as controlled by the narrowing counter of, the invention.

From the lower ends of the instep I and heel areas 35, knitting is resumed on the footer with a two-yarn reinforce in the sole portions, in which area are produced ordinary two-needle narrowing represented by fashion marks 42. This narrowing is effected in substantially the same manner as the narrowings represented by the marks 32 and 33, except that, in the footer machine, there are, as indicated in Fig. 10, a wide comb F and a narrow comb R, the narrowing represented by the marks 42 being effected by moving each wide comb F in unison with its associated narrow comb R. The wide and narrow combs have movement relative to each other.

During the knitting of the two-yarn reinforce, which extends to a course 43, the familiar diamond toe pocket shape is started at an upper course represented by the top mark of a series of fashion marks 44, this narrowing being effected by first having the wide comb F at each side of the blank spaced a one needle distance from its associated narrow comb R whereby, when the wide comb is advanced a two-needle distance it will advance its associated narrow comb by a one-needle distance. After this action, each narrow comb remains in the position to which it had just been moved, and each wide comb is retracted a one-needle distance from its narrow comb to place the combs F and R in the proper positions relative to each other at the starting points in the next subsequent narrowings.

At the course 43, a further extra, or third, yarn is laid to start the heavy reinforce toe pocket T, by introducing a further carrier into the knitting operation, as in each three-yarn heel tab area X.

Figure 11:
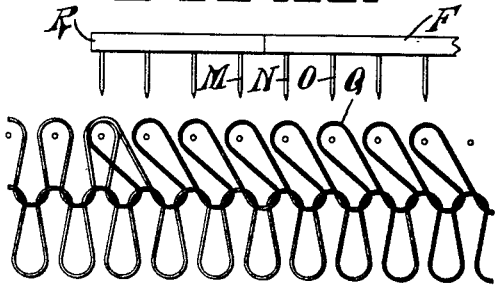

In continuing the diamond-point toe narrowing in the heavy fabric area T, according to the method, and as controlled by the narrowing counter, of the invention, a movement of the combs, different from the movement thereof in the two-yarn sole area S, above set forth, is effected to produce fashion marks 45. In the area T, to start the narrowing, each wide comb F is in engagement with its associated narrow comb R, as indicated in Fig. 10, to, in effect, form a single composite comb. While so engaged, after picking up the loops from the corresponding needles of origin of these loops, the wide and narrow combs are advanced in unison for a one-needle distance, and each transferred loop deposited on the needle next adjacent to its needle of origin, as indicated in Fig. 11. By considering a point M on the small comb R the first or leading point of a series of points in which points N and O, on the wide comb F are the second and third points of such series, in the direction of loop transfer, will be seen the improvement of the invention, as employed in a footer machine, whereby a two needle transfer of a loop Q in this extra-yarn area is effected in one-needle steps, without retracting any comb two needles, and without having to pick up two loops on one point, breaking the yarn, splitting the loops, bending the points, breaking the needle beards, or causing any other adverse effects resulting therefrom.

Figure 12:
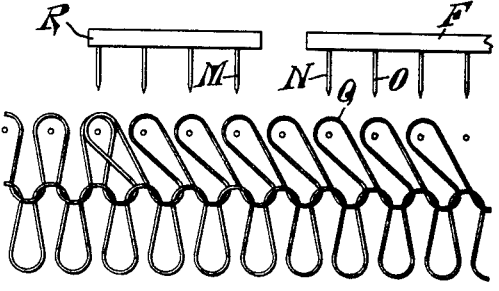
Figure 13:
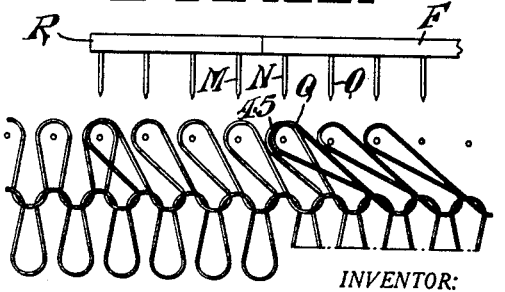

After the loops are deposited each on the next adjacent needle, as indicated in Fig. 11, the wide comb F is retracted a one needle distance, as indicated in Fig. 12, where the loops formerly picked up and transferred from their needles of origin by the wide comb, except the original loop picked up by the point N, are again picked up, this time, each by a point in advance of the one which had formerly picked it up, and again advanced one needle to the position indicated in Fig. 13, wherein each of the loops transferred by the wide comb F, except the original loop picked up by the point N, is on the needle second in position from its needle of origin. Thus, in one aspect, the above-manipulation is to obtain the configuration indicated in Fig. 13, wherein two loops are deposited on the needle corresponding to the point N, without having to simultaneously pick up the two loops by one point to place them there; one of these loops having been transferred only a one needle distance, and the other a two needle distance, and the loop corresponding to the point N having been merely moved out of the way to receive these two loops. After completing the narrowing, the combs remain, or stand, in their final positions to start the next narrowing.

At the extreme lower end of the diamond-point toe, the fashion marks 46 are caused to lie along lines tapering to a point by bringing into play covering knives to prevent narrowing by successively blocking out certain of the leading points in successive narrowing courses and starting the narrowing in each instance with the wide and narrow combs in engagement with each other. At each narrowing, the wide comb, after advancing for a one needle distance with its narrow comb, is next retracted one needle and advanced again with subsequent loops, as above set forth, the only difference in the point movement over that above set forth in the upper three yarn portion of the diamond-point toe residing in the fact that, instead of allowing the combs to stand in the final position attained in one narrowing to start the next narrowing, they are given an idle forward movement of one needle for this purpose.

Mechanism for practicing the method and producing a fabric as above set forth, is illustrated in Figs. 14 to 25; the narrowing counter being applicable to either a legger or a footer, which are similar, except for elements enabling the footer to operate in accordance with the novel method. After a description of the footer, and reference to the above-mentioned elements, the legger and the method will be clearly understood.

Figure 14:
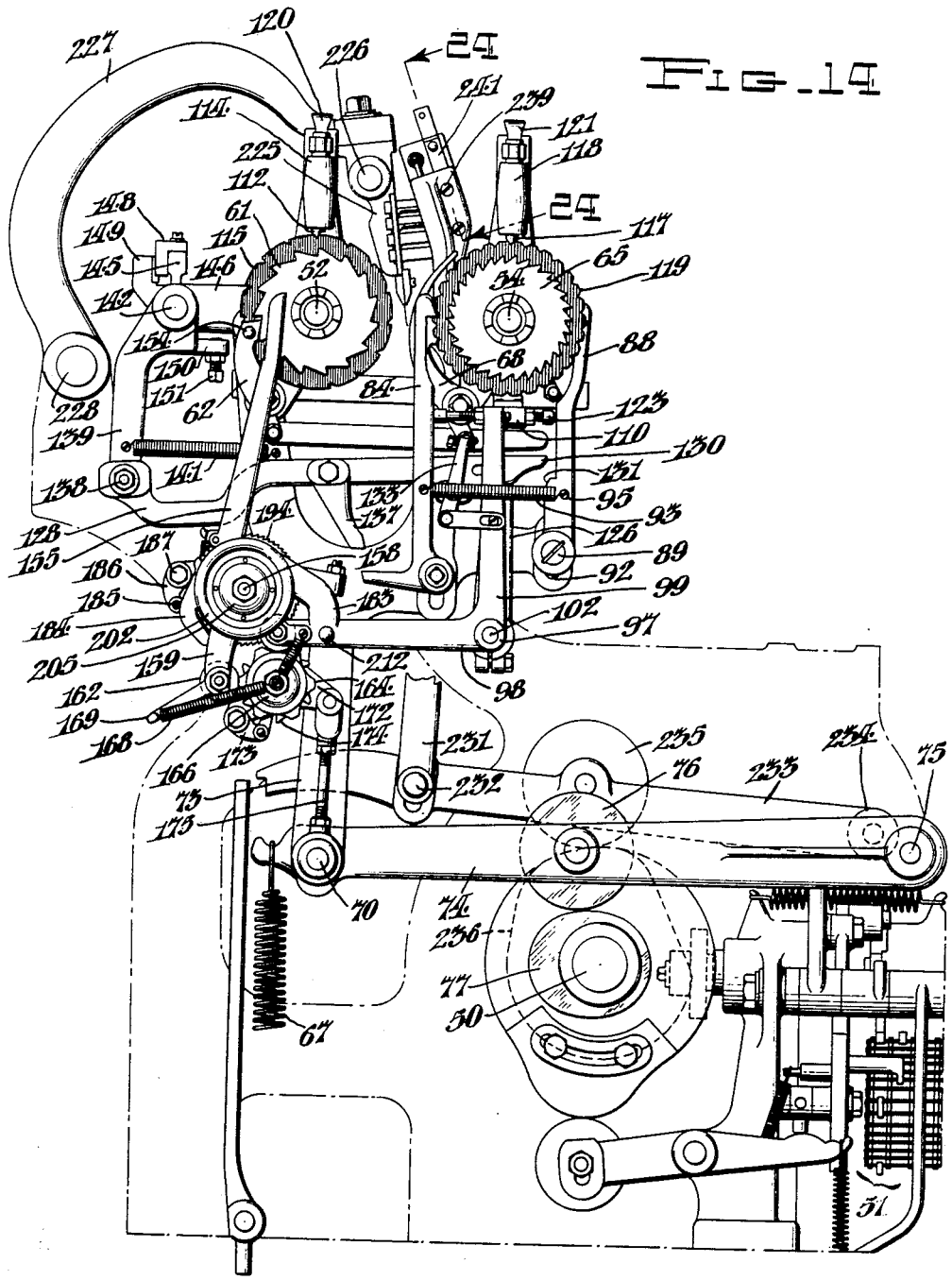
Fig. 14 is a view, in end elevation, of the upper portion of a full-fashioned knitting machine, as viewed from the left, and which is equipped to practice the method, and to operate with the narrowing counter, of the invention.

In Fig. 14, a main cam shaft 50 is shogged axially at given intervals by mechanism controlled by a pattern chain 51. Single screw spindles 52, see also Figs. 15, 17, 23 and 25 to 37, inclusive, control the longitudinal movements of carrier rods 53, Figs. 17 and 25 to 37, inclusive, and double-screw spindles 54 control the longitudinal movements of narrowing rods 55, 56, 57 and 58, Figs. 14, 17 and 24 to 37, inclusive; the rods 55 and 56, carrying the combs R and F, respectively, adjacent to one selvage edge of the fabric, being operable reversely in successive steps to the rods 57 and 58, carrying the combs R and F adjacent to the opposite selvage edge.

A ratchet wheel 61, Figs. 14, 15, 17 and 23, secured to each spindle 52, is normally engaged by a pawl 62 to be advanced by a distance of one tooth, the pawl 62 being pivotally mounted on the outer end of an arm 63 that is mounted on the carrier rod spindle 52 for pivotal movement relative thereto. Ratchet wheels 64 and 65, having oppositely directed teeth, are secured to the spindle 54. A pawl 68, pivotally mounted on an arm 69, is normally adapted to advance the ratchet wheel 64 by a distance of two teeth; the arm 69 being mounted on the narrowing rod spindle 54 in relatively movable relation thereto. The pawls 62 and 68 are pivotally connected, at the lower ends to a link 59; the pawl 68 having a lost-motion connection to the link through a pin 79 in a slot 80 in the link.

The arm 63 carrying the pawl 62, is pivotally connected to an upright arm 71 of an actuator 73, the lower end of which is pivotally connected, by a pin 70, to one end of a lever 74, Fig. 14, which is pivotally connected by a pin 75, at its other end, to the machine frame. The arm 69, carrying the pawl 68, is pivotally connected to one end of a link 72, shown in broken lines in Fig. 15, the other end of which is pivotally connected to a boss 66 on the actuator 73. A spring 67, Fig. 14, connected between the free end of the lever 74 and a portion of the machine frame, biases the lever downwardly.

A follower 76, on the lever 74, for a cam 77 on the cam shaft 50, is adapted to engage the cam, when the cam shaft 50 is shogged axially, under the control of the pattern chain 51, as above indicated. When the follower 76 is engaged by the cam 77, the actuator 73 will be raised in a work stroke upon each revolution of the cam shaft 50, whereby, at each stroke, the arms 63 and 69, and the pawls 62 and 68 thereon, will be turned about the spindles 52 and 54, and, with the pawls normally engaging the ratchet wheels 61 and 64, respectively, the spindles 52 and 54 will be turned. This action advances, or inwardly moves, carrier end-stop nuts 78 and narrowing nuts 81, Figs. 17 and 26 to 37, inclusive, on the spindles 52 and 54, respectively, for a distance of two needles.

The pitch of the teeth of the ratchet wheel 64 corresponds to half the pitch of the teeth of the ratchet wheel 61, whereby, upon an upward stroke of the actuator 73, the ratchet wheel 64 is turned to the extent of two teeth, while the ratchet wheel 61 is turned one tooth, each spindle however, being turned to advance each of the carrier end-stop and narrowing nuts 78 and 81, respectively, for a distance of two needles, A pin 82, adjustably mounted in a slot 83 in the actuator 73, Figs. 14 and 15, pivotally supports a pawl 84 for cooperation with the ratchet wheel 65 to turn the narrowing rod spindle 54 reversely to the direction in which it is turned by the pawl 68; the pawl having a lower laterally-extending arm 85, for a purpose hereinafter set forth.

A pawl 88, for pulling the ratchet wheel 64 forwardly is pivotally mounted by a pin 89, which is adjustably mounted in a slot 92 in the actuator 73. A tension spring 93, connected between pins 94 and 95 on the pawls 84 and 88 respectively, tends to pull each of these pawls into engagement with its respective ratchet wheel.

A bell crank 97, having arms 98 and 99, and pivotally mounted on the machine frame by a pin 102, carries, at its upper end, a mechanism 103, Figs. 15, 16 and 23, which cooperates with the pawl 68 whereby the latter may advance the ratchet wheel 64 either one or two teeth at a stroke of the actuator 73. The mechanism 103 comprises a member 104 pivoted on the narrowing rod spindle 54 to move relative thereto and normally biased clockwise, as viewed in Fig. 15, by a tension spring 105. With the parts in the positions indicated in Figs. 15 and 16, a portion 106 of the member 104 cooperates with a portion 107 of the pawl 68 whereby, when the actuator 73 is raised in an operative stroke, the portion 107 will engage the ratchet wheel 64 and move the latter a distance of only one tooth. With the portion 106 moved counterclockwise out of the way of the portion 107, as indicated in Fig. 23, a single upward stroke of the actuator 73 causes the pawl 68 to advance the ratchet wheel 64 a distance of two teeth. A dog 108 is adapted to engage a shoulder 109 to give the member 104 the above mentioned counterclockwise movement; this dog being mounted on a lateral upper end branch 110 of the arm 99 of the bell crank 97.

A detent 112, Figs. 14 and 17, mounted in a bearing 114 on the machine frame, is spring biased against a locking wheel 115, fixed to the carrier-rod spindle 52, to prevent jarring movement of the spindle in either direction; the detent positively locking the locking wheel 115 against all counterclockwise movement, but allowing the wheel to be moved by the pawl 62 in the clockwise direction. A detent 117, mounted in a bearing 118 on the machine frame, is spring biased against a locking wheel 119, fixed to the narrowing rod spindle 54, to prevent jarring movement of the spindle in either direction, but allowing the wheel to be moved in opposite directions by the pawls 68, 84 and 88. The detents 112 and 117 may be moved into and out of operative relation to the associated locking wheels, by operating members 120 and 121, respectively.

A screw 122, for contact with the reversing pawl 84, is adjustably mounted in the upper end of the arm 99, and a screw 123, for contact with the pulling pawl 88 is adjustably mounted in the branch 110 of the arm 99.

An upright arm 126, pivotally mounted on the pin 102 is connected, by a pin-and-slot connection 127 to a generally-horizontal link 128, which carries a slotted bearing 129 for adjustably fixing a pivot pin 132 for a lever 133; the latter carrying at its upper end, a screw 134 for contact with the reversing pawl 84, and being pivotally connected, at its lower end, to a link 135 having a pin-and-slot connection 136 to the arm 99 of the bell crank 97. The link 128 also carries an adjustably mounted dog 137 for cooperation, at certain times, with the arm 85 on the reversing pawl 84 whereby the latter reverses the narrowing rod spindle by a distance of only one notch of the ratchet wheel 65, instead of two notches, as is effected by the pawl at other times in response to a downward stroke of the actuator 73. An end, or substantially cam-follower portion 130, of the link 128 is adapted, under certain conditions, to engage a cam portion 131 on the arm 88 whereby the latter, instead of racking its ratchet wheel forward two teeth, will rack it only one tooth.

The link 128 is pivotally connected, by a pin 138, to a timing lever 139 that is pivotally mounted on a shaft 142 journaled in a fixed bearing 143, Fig. 17, on an arm 146, and extending parallel to the spindles 52 and 54. A lug 150 on the timing lever 139 carries a stop screw 151 for engagement with the arm 146. A collar portion 144 of the lever 139, having a lateral extension 145 in parallel spaced relation to the shaft 142, is mounted on the shaft, at the opposite side of the bearing 143.

A regulating block, or high cam, 148, adjustably mounted on the extension 145, is engaged, under predetermined conditions, by a bearing or cam-follower surface of a lug 149 on an arm 152 projecting laterally from the carrier-rod nut 78 and slidably embracing the shaft 142. A spring 141, connected between the timing lever 139 and the arm 71 of the actuator 73, holds the regulating block in sliding contact with the bearing surface of the lug 149. An auxiliary regulating block, or low cam 153, is also adjustably mounted on the extension 145; the blocks, or high and low cam portions 148 and 153, respectively, in the footer machine, being spaced apart longitudinally of the carrier rods, as indicated in Fig. 17.

As indicated in Fig. 19, a block or cam 147, in a legger machine, corresponding to the block or high cam 148 of the footer machine, instead of being spaced from its associated low cam 160, corresponding to the low cam 153, is an integral part of this cam.

At times the pawl 62 is held disengaged from the ratchet wheel 61, during alternate strokes of the actuator 73, by a pin 154 that extends laterally from the pawl 62 for engagement with an upper arm 155 of a withholding lever 156 pivotally mounted, by a sleeve portion 157, Fig. 20, on a stationary shaft 158 and having a lower arm 159. By reason of the lost-motion connection between the pawl 68 and the link 59, movement of the pawl 62, by the lever 155, out of engagement with the wheel 61 does not disengage the pawl 68 from its wheel 64; the link 59 being provided to disengage the pawl 68 from the wheel 64 only when the pin 154 is moved manually a greater distance than it is moved by the lever 155 for the resetting operation. The arm 159 carries a follower 162 for seating in recesses 163 of a cam wheel 164 that is rotatably mounted on a stationary stud 165, and damped or braked relative to this stud, as by a resilient annular member 166. The lever 156 is biased in counterclockwise direction, as viewed in Fig. 15, by a spring 168 that is connected between the stud 165 and a member 169 constituting substantially an extension of the arm 159.

A lever 172, of walking-beam character, pivotally mounted on the stud 165, carries, at one end, a pawl 173 biased by a spring 171 between the lever and the pawl for cooperation with a ratchet wheel 174 that is fixed to the cam wheel 164. The other end of the lever 172, is pivotally connected to the upper end of a link 175, the lower end of which is pivotally connected to the pin 70 in the lever 74.

The arm 98 of the bell crank 97 carries, at its free end, a follower 178, also for seating in the recesses 163 of the cam wheel 164, toward which the follower is biased by a spring 179 that is connected between the stud 165 and a pin 182 on the arm 98.

The narrowing counter includes a side branch 183 of the arm 98 which is of inverted substantially U-shape connected at the end of one of its legs to the arm 98, and having its other legs 184 constituted as a cam on which a pin 185 acts as a follower to control the action of a pawl 186 about its pivot pin 187 on one arm of another lever 188 of walking-beam character. The lever 188 is journaled on the shaft 158, to turn relative thereto, and carries, on its other arm, an adjustable screw 192 for contact with a side lug 193 on the actuator 73. The pawl 186 is biased by spring 191, between a pin 219 and the pawl, for cooperation with a rotary ratchet-like narrowing counting wheel or indexing member 194 disposed with other elements of the counting means at a fixed location relative to the spindles 52 and 54, operating independently of these spindles or the nuts thereon, and being substantially coextensive longitudinally of the spindles with the spindle actuating means at the outer ends thereof. Narrowing counting wheel 194 has a sleeve portion 195 journaled on the shaft 158 to rotate relative thereto and to the lever 188, and has an annular side flange 196 having a notch 197 therein. The sleeve portion 195 extends through the sleeve 157 of the lever 156, and carries, at the side of the sleeve 157 opposite to that at which the narrowing counting wheel 194 is disposed, a hand wheel 202 secured thereto, as by a set screw 203 extending through a sleeve portion 204 of the hand wheel. The hand wheel is engaged by a resilient annular damping or brake member 205 secured to the stationary shaft 158. The sleeve portion 204 of the hand wheel 202 has a side lug 206 for engagement with the stop lug 207 on a portion 208 of the branch 183 of the arm 98. The portion 208 encloses a detent 209 that is spring biased toward the counting wheel 194. The detent 209 is positioned on the radially outer side of the flange 196, as indicated in Fig. 21, to hold both the follower 162 and the follower 178 off the cam wheel 164 until the counting wheel is ratcheted to position wherein the notch 197 arrives opposite the detent, whereupon the detent drops through the notch, to the position indicated in Figs. 15 and 20, to allow the follower 178 to ride on the cam wheel 164. A handle 212 is provided on the side of the arm 98, whereby lifting the follower 178 off the cam wheel 164 is effected after the hand wheel 202 is turned back to a given position from which counting is started to produce the operations caused when the detent drops through the notch. In lifting the handle 212, a sloping surface on the detent 209 engages a sloping surface on the flange 196, Fig. 20, to depress the detent and allow it to pass from the inner side of the flange to the outer side thereof, to the position indicated in Fig. 21. In thus lifting the detent by means of the handle 212, a lug 214 on the branch 183 engages a pin 215 to prevent release of the pawl 62 from its ratchet wheel 61 by movement of the withholding lever 155 until the detent allows the arms 183 and 98 to drop again to their lower position. Also, when the handle 212 is lifted, the cam 184 allows the pin 185 to move from its position of Fig. 15, in which it holds the pawl 186 out of engagement with the counting wheel 194, to its position of Fig. 23, in which the pawl 186 engages and moves the wheel 194 one tooth upon each upward movement of the actuator 73. A set screw 216 in a stationary part 217 limits clockwise movement of the lever 188, as seen in Fig. 15, by a spring 218 connected between a pin 219 on the lever 188 and a hook-like portion 222 on the part 217.

Upon each upward stroke of the actuator 73, the pawl 173 racks the cam wheel 164 to position the followers 162 and 178 successively opposite high and low, and low and high, points of the cam wheel 164, respectively. With the detent 209 on the flange 196, as in Fig. 21, the followers 162 and 178 are held out of operative relation to the wheel 164, and the pin 185 is so related to the cam end 184 of the bell crank arm 98 that, upon each upward stroke of the actuator 73, the lug 193 engages the screw 192 to cause the pawl 186 to rack the counting wheel by a distance of one tooth.

As indicated in Fig. 14, the narrowing rods 55, 56, 57 and 58 are longitudinally slidably mounted in brackets 225 on a front narrowing shaft 226 carried by a rock lever 227 that is pivotally mounted on a back narrowing shaft 228 journaled in the machine frame.

Dipping movement of the narrowing rods is effected in a usual manner by a link 231 pivotally connected by a pin 232, to an arm 233 that is pivotally connected at a position 234 to the machine frame, and carries a cam follower 235 for cooperation with a cam on the shaft 50.

In Figs. 24 and 25, an attachment is indicated for discontinuing the operation of the point combs, as above described in the tip of the diamond-point toe, whereby the machine may be caused to operate as an ordinary machine when double-needle narrowing is effected in a diamond-point toe area of less than three threads; there being four of these attachments, provided one on each narrowing nut.

Each of these attachments comprises a cam-face element 238 yieldably biased toward the adjacent face of the narrowing nut 81 by spring-biased studs 239. A slide or plunger 241 operates between the nut 81 and the element 238 whereby the outer face of the element 238 may be placed a one-needle distance closer to, or further from, the nut.

During operation of the machine in a three-thread diamond-point toe area, as above set forth, the slide 241 is in the position of Fig. 24 whereby, when the narrowing rods are dipped, the device has no effect on the operation.

However, where ordinary two-needle narrowing is effected, to maintain a one-needle split between the wide and narrow combs in the lowermost tapered tip of the diamond-point area, and, at the same time have the outer edge of the taper area parallel to the adjacent selvage edge, when the rods dip, a contact screw 242 on the rod 57 and a contact screw 243 on the rod 58 move vertically downwardly from the positions thereof in Fig. 25. This same action occurs on a like attachment cooperating with the rods 57 and 58 at the other end of the machine. The nut 81 is then advanced two needles in doing which, the screw 243 and the rod 58 are moved two needles. However, by reason of a sloping-surface step 245 between high and low surfaces 246 and 247, respectively, spaced a one-needle distance apart, when the rods dip, the screw 242 is positioned a one-needle distance away from the nut, so that during the two needle advance of the latter, the screw 242, and consequently the rod 57, are advanced only one needle. When the rods rise, after the dip, the screw 242 rides up the sloping surface 245 from the low cam surface 247 to the high cam surface 246 whereby to advance the rod 57 a further one-needle distance to maintain the split between the associated wide and narrow combs for the start of the next narrowing operation. Operations similar to those above described with respect to the rods 57 and 58, are also simultaneously effected at each end of the machine by like attachments cooperating with the rods 55 and 56.

In operation, the legger machine operates in a usual manner, with the narrowing mechanism inactive, to lay full-width courses from the first course of the welt to the first two-needle narrowing course in the knee area K, where, as shown in Fig. 23, the follower 149 is disposed on the high cam 147, the pawl 62 is in operative relation to its ratchet wheel 61, the withholding lever 155 is spaced to the right, and clear of, the pin 154, as viewed in Fig. 15, the pawl 68 is in operative relation to its ratchet wheel 64, the portion 106 is below the portion 107 whereby the pawl 68 advances the ratchet 64 two notches upon each reciprocation of the actuator 73, and the follower 178 is held out of engagement with its cam 164 by the detent 209 which is riding on the flange 196. In this position of the follower 178 and the arm 99 of the bell crank 97, the screw 123 engages the pawl 88, and the screw 134 engages the pawl 84, to hold these pawls in inactive position. Also, the dog 108 is held against the shoulder 109 to hold the portion 106 of the member 104 out of the way of the portion 107 of the pawl 68 whereby the wheel 64 may be notched two teeth. The detent 209 is placed on the flange at the start of operations whereby, when the above-mentioned narrowing begins, the ratchet or counting wheel 194 will be racked one notch with each upward movement of the actuator 73. In so placing the detent 209 on the flange 196, the number of teeth which the wheel 194 will have to move before dropping the detent through the notch 197, is determined by turning the hand wheel 202. Thus, so long as the detent rides on the flange, the follower 178 will remain off the cam 164 while the other parts of the mechanism are operating. The parts assume the relations above indicated in each of the narrowing courses of the leg indicated by the fashion marks 32 and 33.

At the first fashion mark 39, in the triple-thread heel-tab area X, the wheel 194 has counted the previous two-needle narrowings, or been notched one tooth for each narrowing, so that, when the first course of narrowings to be effected in accordance with the invention is reached, the detent 209 drops through the notch 197 in the flange 196, whereupon the follower 178 falls into position on the cam 164, and the lug 214 recedes downwardly from the pin 215 so that when the follower 162 drops into a recess 163 of the cam wheel 164, the spring 168 will move the lever 155 counterclockwise against the pin 154 to remove the pawl 62 from its ratchet wheel 61 at every other upward stroke of the actuator 73. By reason of the lost-motion connection of the pin 79 and the slot 80, the pawl 68 is not disengaged from its associated ratchet wheel 64 by the link 59. Also, link 128 moves cam portion 130 forward so that on the downward stroke of actuator 73, the cam portion 130 will engage cam surface 131 of pawl 88 only sufficiently to cause a one needle forward movement of ratchet 64.

Upon one upward stroke of the actuator 73, the pawl 62 engages and advances its ratchet wheel 61 one notch, equal to an advancement of the carrier rod nut for a distance of two needles. At the same time, the pawl 68 engages its ratchet wheel 64 to advance it one notch, equal to an advancement of the narrowing rod nut for a distance of one needle. By this action, the comb C is advanced one needle from the position of Fig. 6 to the position of Fig. 7.

Figure 8:
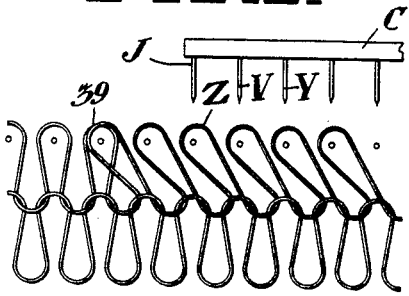
Figure 9:
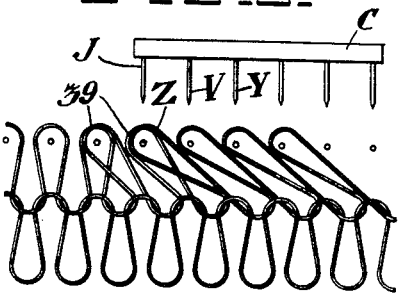

Upon the ensuing down stroke of the actuator 73, the pawl 68 is thrown out of engagement with its ratchet wheel 64 by engagement of the member 104 with portion 107 of the pawl, so that the pawl 84 may pull the ratchet wheel backward for a distance of two teeth, equal to movement of the narrowing nut for a distance of two needles, to obtain the movement of the comb C from its position of Fig. 7 to its position of Fig. 8.

Upon the next upward stroke of the actuator 73, the pawl 62 is held out of engagement with its ratchet wheel 61 by lever arm 155, so that the carrier rod nut and the end stops are unaffected, and the pawl 84 is held out of engagement with its ratchet wheel 65. Pawl 68, however, is active on this up stroke and moves ratchet wheel 64 forward one notch, equal to a distance of one needle, thus changing the comb C from its position of Fig. 8 to that of Fig. 9. Upon the next down stroke of the actuator 73, the pawl 88 engages its ratchet wheel 64 to pull the spindle 54 forward two notches, equal to a distance traveled by the narrowing nut of two needles, to move the comb C to a new position; these operations being repeated in successive narrowing courses in the heel-tab area X, between which, by shogging of the main cam shaft 50, the narrowing mechanism is inactive, and stands as at the finish of the previous narrowing for starting each succeeding narrowing operation. In the legger, the arm 85 and the dog 137 may be omitted, so far as the leg portion of the blank of Fig. 2 is concerned, since, although they are employed in the footer, they do not come into play in forming the leg of this blank.

On the footer machine, in the two needle narrowing of the gusset, represented by the fashion marks 42, the pawls 62 and 68, as shown in Fig. 23, remain in operative relation to the ratchet wheels 61 and 64, the pawls 84 and 88 are held out of operative relation to the ratchet wheels 65 and 64, the follower 149 is on the high cam 148, the dog 137 is out of the vertical path of the arm 85, and the follower 178 is held out of engagement with the cam wheel 164 so that, upon each narrowing operation, the combs R and F are simultaneously moved forwardly two needles and allowed to stand for the start of the next narrowing course, as in ordinary two needle narrowing, between the narrowing courses of which, the narrowing mechanism is again inactive.

In the area represented by the fashion marks 44, which is only a two-thread area, usual two needle narrowing is continued, but by reason of the fact that the marks 44 of successive narrowing courses lie on lines lengthwise of the blank sloping relative to the selvage edges of the toe pocket at this part of the blank, the movement of the points is different from that which it has in the gusset.

In forming the marks 44, the pawls 62 and 68 remain in operative relation to the ratchet wheels 61 and 64, the pawl 84 is positioned to rack the wheel 65 one notch backward, the pawl 88 is laid out of operation, the follower 149 is on no cam, but is disposed between the high cam 148 and the low cam 153, the follower 178 is held out of operative relation to its cam 164, and the dog 137 is in position to intercept the arm 85 whereby the pawl 84, instead of back racking the ratchet wheel 65 two teeth at each actuation or down stroke of the actuator 73, back racks this wheel only one tooth.

As seen in Fig. 26, the parts are in position to pick up the loops in forming a mark 44, the narrow combs R carried by rods 55 and 57 being spaced a one needle or distance $a$ from the wide combs F carried by rods 56 and 58. Upon the upstroke of the actuator 73, the carrier end stop nuts 78 are moved two needles or from $d$ to $e$, the wide combs F are advanced two needles or from $s$ to $w$, and the narrow combs R are thereby advanced one needle by the wide combs in transferring the picked up loops, in doing which, the parts move from the positions of Fig. 26, to the positions of Fig. 27.

To reposition the points for the next narrowing, upon the downstroke of the actuator 73, the pawl 84 engages the wheel 65 to back rack the spindle 54 and the narrowing nuts 81 one needle or to a point $t$, in doing which, the narrow combs R remain in the position to which they had been moved by the wide combs F and the wide combs are moved backwardly one needle from the position of Fig. 27 to the position of Fig. 28.

At the first narrowings represented by the mark 45 in the triple-thread toe-pocket, the counting wheel 194 has been advanced to a position in which the detent reaches, and passes through, the notch 197 in the flange 196, which allows the follower 178 to drop into a recess 163 of the cam wheel 164 and the follower 162 to engage a high point of the cam wheel 164. At the same time, the lug 214 is removed from position against the pin 215, whereby, as in the triple-thread heel-tab area, the lug 214 is removed from the path of the pin 215, and the lever 155 is in condition, when the follower 162 moves into a recess 163 of the cam wheel 164, to be moved by the spring 168 against the pin 154 on the pawl 62. This action moves the pawl 62 out of engagement with the ratchet wheel 61.

Under these conditions, and with the narrow combs R and the wide combs F together, as indicated in Fig. 10, and by the positions of the narrowing rods in Fig. 29, pick up of the loops is effected by operation of the follower 235 on its cam 236 on the main cam shaft 50, after which, upon the first upward stroke of the actuator 73, the pawl 68 advances its ratchet wheel 65, and with it, both the narrow and wide combs R and F, a distance of one needle or from $s$ to $t$, from the position of Fig. 10 to the position of Fig. 11, as controlled by the narrowing nuts in the positions of Fig. 30. At the same time the pawl 62 advances its ratchet wheel 61, one notch, to advance the carrier rod nuts 78 two needles or from $d$ to $e$.

After depositing the loops on the first next adjacent needles, by dipping action of the rock lever 227, the return, or downward stroke of the actuator 73 causes the pawl 84 to back rack the narrowing spindle 54 one notch, or one needle from $t$ to $s$, whereby the wide comb F is retracted a one needle distance, to the position of Fig. 12, leaving the narrow comb R in the position to which it had just been advanced by the wide comb in making the first pick up. During the above-mentioned back racking of the ratchet 65 by the pawl 84, the pawl 68 is held out of engagement with its associated ratchet wheel by engagement of the pawl 68 with the member 104, and the pawl 84 is constrained to back rack the wheel 65 by only one tooth, by cooperation of the dog 137 of link 128 with arm 85 of pawl 84.

After the loops have been again picked up, through action of the rock lever 227 by the cam 236, upon the next upward stroke of the actuator 73, the pawl 68 again advances its ratchet wheel 64 one notch or from s to t, to advance the wide comb F from the position of Fig. 12 to the position of Fig. 13, during which movement the narrowing rods 56 and 58 carrying the wide combs F are moved from the positions of Fig. 31 to the positions of Fig. 32, where the wide combs stand against the narrow combs R, as in Fig. 10, but in position for the next narrowing operation. These actions are repeated during the forming of each of the fashion marks 45, with the narrowing mechanism inactive in courses not having narrowings.

With the combs R and F standing, as positioned by the rods in Fig. 33, in forming the first fashion marks 45, in the extreme lower tapered end tip of the triple-thread reinforced toe pocket area, upon the first upward stroke of the actuator 73, the pawl 62 will advance its ratchet wheel one notch to advance the carrier rod nuts 78 two needles or from d to e, and, simultaneously therewith, the pawl 68 will advance its wheel 64 one notch or a distance of one needle from s to t; this one needle advance movement being that of the combs R and F, as in Fig. 10, or from the position of Fig. 33 to the position of Fig. 34.

Upon the first downward stroke of the actuator 73, the pawl 84 will back rack the wheel 65 one notch or from t back to s, being constructed to do this by coaction between the dog 137 and the arm 85, to position the parts as indicated in Figs. 12 and 35. Upon the next upward stroke of the actuator, the pawl 62 is held out of engagement with its ratchet wheel 61 whereby the positions of the end stops are unaffected, but the pawl 68 engages and advances its wheel 64 one tooth or from s to t, to position the parts as in Figs. 13 and 36; this action being the same as in forming the marks 45. However, instead of being allowed to stand in the last above indicated position to start the next succeeding marks, as in forming a series of the marks 45, upon the second downward stroke of the actuator 73, the follower 149 is on the low cam 153 whereby the end, or cam follower portion 130, of the link 128 is in position to engage the cam portion 131 of the pawl 88, which causes the latter to advance the ratchet wheel 64 one notch to move the combs R and F forward one needle from the position of the narrowing rods in Fig. 36 to the positions thereof in Fig. 37.

Of course, the improvements specifically shown and described, by which the above-mentioned results are obtained, may be changed in various ways without departing from the invention herein disclosed and claimed.

I claim:

1. In a full-fashioned knitting machine including yarn carriers, narrowing points, separate stops for limiting the travel of the carriers and the points, spindles for actuating the stops, a reciprocable member, means operable by the reciprocable member for at one time operating the spindles simultaneously in one direction and at another time independently operating one of the spindles in either direction, a cyclic control device interconnecting the reciprocable member and the spindle operating means to alternately affect the spindle operating means to change the operation thereof on the spindles at each reciprocation of the reciprocable member, and counting means operable by the reciprocable member for determining the operation of the cyclic control device.

2. In a full-fashioned knitting machine including yarn carriers, narrowing points, separate stops for limiting the travel of the carriers and the points, spindles for actuating the stops, a reciprocable member, means operable by the reciprocable member for at one time operating the spindles simultaneously in one direction and at another time independently operating one of the spindles in either direction, a cyclic control device operated directly through the reciprocation of the reciprocable member, connecting means between the cyclic control device and the spindle operating means to effect a change in the operation of the spindle operating means, and counting means operable by the reciprocable member for determining the operation of the cyclic control device.

3. In a full-fashioned knitting machine, including yarn carriers, narrowing points, separate stops for limiting the travel of the carriers and the points, spindles for actuating the stops, a reciprocable member, means operable by the reciprocable member for at one time operating the spindles simultaneously in one direction and at another time independently operating one of the spindles in either direction, a cyclic control device interconnecting the reciprocable member and the spindle operating means, said device operating to change the condition of the spindle operating means at each reciprocation of the reciprocable member, and counting means operable by the reciprocable member for determining the operation of the cyclic control device.

4. In a full-fashioned knitting machine, including yarn carriers, narrowing points, separate stops for limiting the travel of the carriers and the points, spindles for actuating the stops, a reciprocable member, means operable by the reciprocable member for at one time operating the spindles simultaneously in one direction and at another time independently selectively operating in either direction the spindle for controlling the narrowing point end stops, a cyclic cam control device, means connected to the reciprocable member and responsive to reciprocation thereof for actuating the cam control device, means controlled by the cyclic control device for effecting the variations in the operation of the spindle operating means, and counting means operable by the reciprocable member for determining the operation of the cyclic control device.

5. In a full-fashioned knitting machine, including yarn carriers, narrowing points, separate stops for limiting the travel of the carriers and the points, spindles for actuating the stops, a reciprocable member, means operable by the reciprocable member for operating the spindles simultaneously in one direction and independently operating one of the spindles in either direction, a cyclic control device, means for connecting the cyclic control device to, and operating it by, the reciprocable member, means operated by the cyclic control device and connected to the spindle operating means to at one time simultaneously turn the spindles in one direction and at another time to simultaneously turn one of the spindles in either direction and to disconnect the other spindle from the spindle turning means, and counting means operable by the reciprocable member for determining the operation of the cyclic control device.

6. In a straight knitting machine, fashioning means for effecting two-needle narrowings in two-needle steps and two-needle narrowings in one-needle steps, and a readily adjustable narrowing counter for controlling the fashioning means to effect one of said narrowings in each of any selected number of courses and operative upon the completion of said number to cause the fashioning means to change its operation to effect the other of said narrowings.

7. In a straight knitting machine, fashioning means for effecting two-needle narrowings in two-needle steps and two-needle narrowings in one-needle steps, and a narrowing counter including a ratchet device operable step-by-step for controlling the fashioning means to effect one of said narrowings in each of a predetermined number of courses and upon the completion of said number to change the operation of the fashioning means to effect the other narrowing.

8. In a straight knitting machine, fashioning means for effecting two-needle narrowings in two-needle steps and two-needle narrowings in one-needle steps, and a narrowing counter including a rotary member for controlling the fashioning means to effect one of said narrowings in each of a predetermined number of courses, and upon the completion of said number to change the operation of the fashioning means to effect the other narrowing.

9. In a straight knitting machine, fashioning means for effecting two-needle narrowings in two-needle steps and two-needle narrowings in one needle steps, including a narrowing-rod nut and a spindle for carrying the nut, and a narrowing counter disposed at a fixed position longitudinally of the spindle for controlling the spindle to effect one of said narrowings in each of a predetermined number of courses and upon the completion of said number to change the operation of the fashioning means to effect the other narrowing.

10. In a straight knitting machine, fashioning means for effecting two-needle narrowings in two-needle steps and two-needle narrowings in one-needle steps including carrier rods, stops for the rods and a spindle having a nut thereon for carrying the stops, and a narrowing counter operated independently of the carrier rod nut for controlling the fashioning means to effect one of said narrowings in each of a predetermined number of courses and upon the completion of said number to change the operation of the fashioning means to effect the other narrowing.

11. In a straight knitting machine, fashioning means for effecting two-needle narrowings in two-needle steps and two-needle narrowings in one-needle steps including a narrowing-rod nut and a spindle for carrying the nut, means locally disposed adjacent to one end of the spindle for actuating the spindle, and a narrowing counter for controlling the spindle to effect one of said narrowings in each of a predetermined number of courses and upon the completion of said number to change the operation of the fashioning means to effect the other narrowing.

12. A mechanism for operating a narrowing spindle of a full fashioned knitting machine adapted for use in legger, footer and single unit machines comprising a narrowing spindle, a narrowing nut therefor, a reciprocating member, two means for turning said spindle in opposite directions to move the nut when said member moves in one direction, a third means for turning said spindle in one of said directions on the reverse movement of said member, and means whereby said three means may each operate to turn the spindle to move the nut either one needle distance or two.

13. A mechanism for operating a narrowing spindle of a full fashioned knitting machine comprising two toothed wheels fixed to said spindle and having their teeth pointed in opposite directions, a reciprocating member, three pawls connected to said member to operate on said wheels, one of said pawls adapted to turn said spindle forward on the movement of said member in one direction, a second one of said pawls adapted to turn said spindle forward on the movement of said member in the other direction, and the third of said pawls adapted to turn said spindle backward on movement of said member in said other direction, and automatic means for controlling said second and third pawls to throw one out of action when the other is operating on its toothed wheel.

14. A mechanism for operating a narrowing spindle of a full fashioned knitting machine comprising two toothed wheels fixed to said spindle and having their teeth pointed in opposite directions, a reciprocating member, three pawls connected to said member to operate said wheels, one of said pawls adapted to operate said spindle forward on the movement of said member in one direction, a second one of said pawls adapted to turn said spindle forward on the movement of said member in the other direction, and a third of said pawls adapted to turn said spindle backward on movement of said member in said other direction, and automatic means for controlling said pawls so that each may turn the spindle either two teeth per operation or one and to prevent said second and third pawls from acting on their wheels during the same movement of said member.

15. A mechanism for operating a narrowing spindle of a full fashined knitting machine comprising equally toothed wheels on said spindle, a reciprocating member, three pawls connected to said member to operate said spindle by acting on said wheels, and automatic means for controlling said pawls to cause said spindle to perform the following cycle during two successive complete reciprocations of said member: (a) turn forward one tooth, (b) turn back two teeth, (c) turn forward one tooth, and (d) turn forward two teeth.

16. A mechanism for operating a narrowing spindle of a full fashioned knitting machine comprising equally toothed wheels on said spindle, a reciprocating member, three pawls connected to said member to operate said spindle by acting on said wheels, and automatic means for controlling said pawls to cause said spindle to perform the following cycle during two successive complete reciprocations of said member: (a) turn forward one tooth, (b) turn back one tooth, (c) turn forward one tooth, (d) turn forward one tooth.

17. A mechanism for operating a narrowing spindle of a full fashioned knitting machine as set forth in claim 15 and in which the automatic means for controlling the pawls is adapted to cause the spindle to perform optionally the following cycle in addition to that stated in claim 15: (a) turn forward one tooth, (b) turn back one tooth, (c) turn forward one tooth, and (d) turn forward one tooth.

18. A mechanism for operating a narrowing spindle of a full fashioned knitting machine comprising equally toothed wheels on said spindle, a reciprocating member, three pawls connected to said member to operate said spindle by acting on said wheels, and automatic means for controlling said pawls to cause said spindle to perform the following cycle during two successive complete reciprocations of said member: (a) turn forward one tooth, (b) turn back two teeth, (c) turn forward one tooth, and (d) turn forward one tooth.

19. In a full fashioned knitting machine, the combination of a narrowing spindle having two toothed wheels, the teeth of one of said wheels inclined oppositely from those of the other, a reciprocating member, three pawls on said member, two pawls arranged to act on said wheels to turn said spindle in the narrowing direction and the other pawl to turn the spindle in the reverse direction, a link arranged to affect when moved in a certain way the operation of said reversing pawl and one of said narrowing pawls, a carrier spindle and means to turn it, a nut on said carrier spindle, and cam means operated by said nut for moving said link to affect the operation of the pawls with which it is associated.

20. In a full fashioned knitting machine, the combination as set forth in claim 19 together with a cyclic control device, a lever adapted to be oscillated by said device, and means whereby said lever affects the operation of the same levers acted on by the link.

21. In a full fashioned knitting machine, the combination as set forth in claim 19 together with an oscillatable lever, means to oscillate said lever, means whereby the oscillation of said lever affects directly the same pawls acted on by the link, and means controlled by said oscillatable lever in conjunction with the link for affecting the reversing pawl.

22. In a full fashioned knitting machine, the combination as set forth in claim 19 together with an oscillatable lever, means to oscillate said lever, means whereby the oscillation of said lever affects the same pawls acted on by the link, and means whereby said lever affects also the third pawl associated with the narrowing spindle.

23. In a full fashioned knitting machine, the combination of a narrowing spindle, means to operate said spindle in either the narrowing or reverse direction including three pawls, two for the narrowing and one for the reverse direction of operation of the spindle, an oscillatable lever adapted to affect the operation of the reversing pawl and one of the other two, rotatable cam means for oscillating said lever, a narrowing counter adapted in one position to maintain said lever out of range of said rotatable cam means and in another position to permit the cam means to oscillate the lever, and means for setting said counter to permit said lever to begin to be oscillated after a given number of narrowing operations.

24. In a full fashioned knitting machine, the combination of a narrowing spindle, means to operate said spindle in either the narrowing or reverse direction including a pawl and toothed wheel for the narrowing direction of operation of the spindle, said pawl adapted to move said wheel two teeth at a time, a member pivoted on said spindle for affecting the action of said pawl and biased to a position whereby said pawl can move said wheel only one tooth at a time, a pivoted lever adapted to contact said pivoted member, and means for holding said lever either in position to permit said pivoted member to restrict the action of said pawl or to prevent the member from affecting the pawl.

25. In a straight knitting machine, carrier rod and fashioning point spindles, a carrier rod nut, operating means for the spindles including means for operating the fashioning point spindle forwardly and backwardly, a cam shaft, means for actuating said operating means by the cam shaft, means for selectively controlling the operation of said fashioning spindle by said operating means including cam means controlled by the carrier-rod nut, a lever means adapted to be held either in position to affect said operating means for the spindles or in position in which it has no effect thereon, a cyclic control device operated by said actuating means and adapted to hold said lever means in either of said two positions, and a narrowing counter adapted either to move in response to each cycle of movement of said actuating means or to be unaffected thereby, said counter arranged to maintain said lever means in its ineffective position while the counter is responsive to movements of said actuating means and to permit said lever means to occupy its effective position when the counter ceases to respond to said actuating means.

JOSEPH HELD.